United States Patent [11] 3,612,878

[72] Inventor  Keith E. Nelson
              Rolling Hills Estates, Calif.
[21] Appl. No. 776,282
[22] Filed     Nov. 15, 1968
[45] Patented  Oct. 12, 1971
[73] Assignee  TRW Inc.
              Continuation of application Ser. No.
              385,227, July 27, 1964, now abandoned.

[54] METHOD AND APPARATUS FOR MEASURING THE RADIANT ENERGY REFLECTANCE OF MATERIALS
     10 Claims, 4 Drawing Figs.
[52] U.S. Cl. ............................................. 250/83.3 H,
                                                  356/51, 356/212
[51] Int. Cl. ............................................. G01n 21/22,
                                                           G01n 21/48
[50] Field of Search .......................................... 356/51,
                                            188, 212; 250/226, 83.3 IR, 83.3 H

[56]                References Cited
                UNITED STATES PATENTS
2,046,714  7/1936  Wilson et al. ................. 250/226
3,089,382  5/1963  Hecht et al. .................. 356/188
3,273,448  9/1966  Kelly .......................... 356/188

Primary Examiner—Ronald L. Wibert
Assistant Examiner—Orville B. Chew, II
Attorney—Daniel T. Anderson ABSTRACT: To provide a method and apparatus for measuring reflectances independent of the sample temperature, the sample is alternately irradiated by hot and cold radiation which is picked up by one or more detectors.

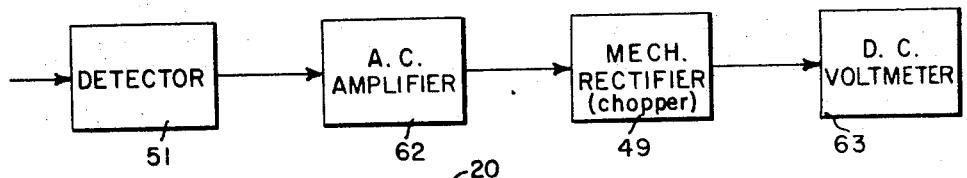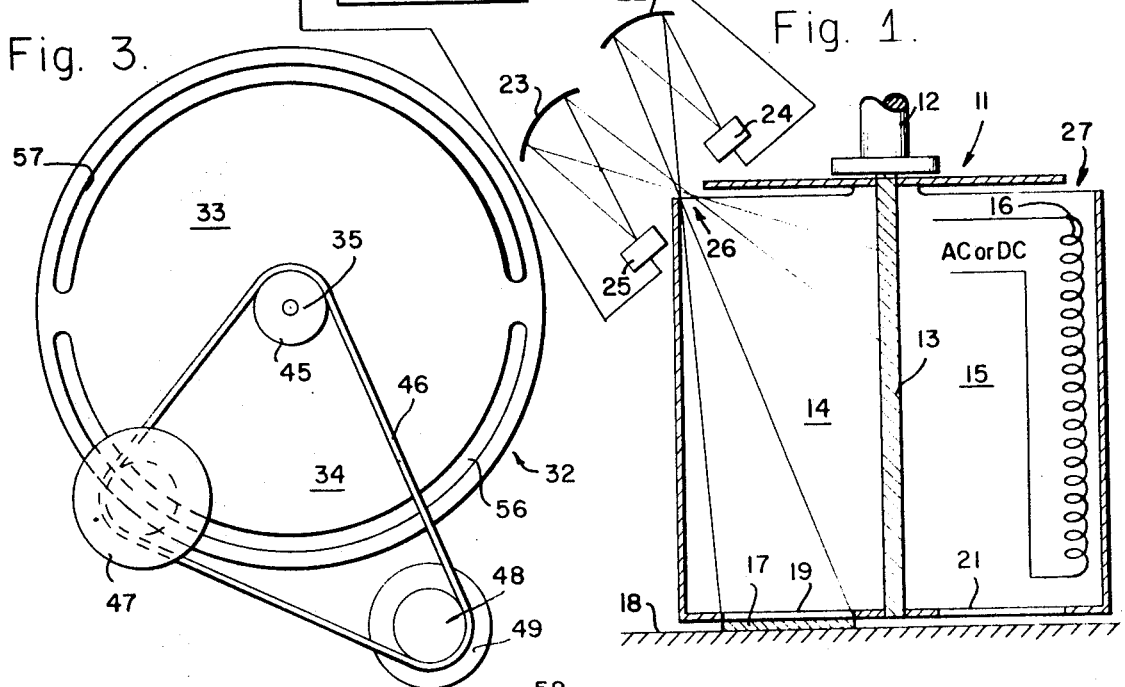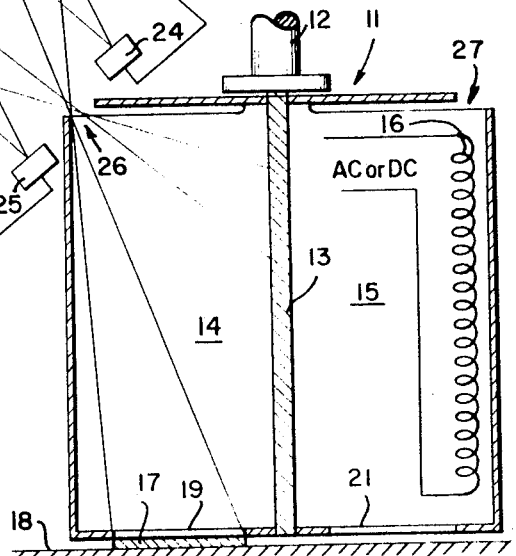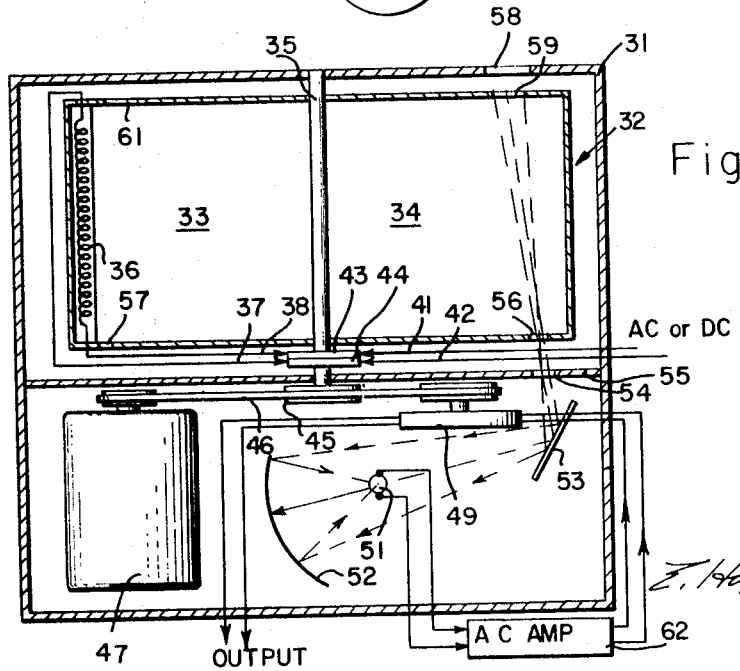
Keith E. Nelson, INVENTOR.
BY.
F. Hayward Marshall
AGENT.

METHOD AND APPARATUS FOR MEASURING THE RADIANT ENERGY REFLECTANCE OF MATERIALS

This application is a continuation of U.S. Pat. application No. 385,227 filed on July 27, 1964 and assigned to the assignee of this invention, now abandoned.

This invention relates to a method and apparatus for measuring the reflectance of materials, and more particularly to an apparatus which measures the reflectance independent of sample temperature whereby an output is provided which directly indicates the reflectance without requiring a separate temperature measurement and computation of the reflectance indirectly. Since the emittance has a simple relationship with the reflectance, (i.e. $\rho=1-\epsilon$ for diffuse samples) the value of the emittance may be readily obtained from this relationship.

Apparatus previously used for obtaining the reflectance or emittance of sample materials have utilized a detector, some of which are cooled, or a thermoelectric junction. Both the detector and the thermoelectric junction make a direct measurement of the emitted plus reflected energy. However, in order to utilize the output from the detector, it is necessary to make a temperature measurement of the sample simultaneously and calculate the emissivity utilizing the mathematical relationship.

Briefly stated, one preferred embodiment of the present invention consists essentially of a cylindrical body which is divided into two semicylindrical cavities which are separated by an insulating partition and maintained at two different temperatures. The semicylindrical cavities are provided with arcuate openings at opposite ends thereof, and the sample is placed adjacent the arcuate opening at one end and one or more detectors are positioned to receive radiation from the sample and cavity through the arcuate slots at the opposite end. The cylinder is rotated at a constant speed and the output from the detector is supplied to an electronic circuit which provides an output proportional to the reflectance of the sample material.

One object of the present invention is to provide a method and apparatus for measuring reflectance independent of the sample temperature, and wherein the temperatures within the instrument itself need not be known.

Another object of the present invention is to provide a small portable instrument for measuring the reflectance and/or emittance of materials at room temperature in a simple and rapid manner, in order to meet such requirements as quality control of materials, material selection and sorting functions, and which may be used for total radiation or for monochromatic radiation measurements.

Other objects and many of the attendant advantages of this invention will be readily appreciated, as the same becomes better understood by reference to the following detailed description, when considered with the accompanying drawings, wherein:

FIG. 1 is a schematic view illustrating one preferred embodiment of the present invention which utilizes two detectors;

FIG. 2 is a longitudinal sectional view illustrating another preferred embodiment of the present invention which utilizes a single detector;

FIG. 3 is an end view with portions broken away to illustrate the arrangement of the cylindrical rotor forming the hot and cold cavities with the drive motor and synchronized chopper for providing the output signal; and FIG. 4 is a block diagram illustrating one preferred form of the output circuit to provide a DC voltage reading proportional to the reflectance of the sample material to be used in conjunction with the modification illustrated in FIGS. 2 and 3.

MODIFICATION I

Referring now to the drawings in detail and more particularly to FIG. 1, a cylindrical rotor 11 is mounted on a shaft 12 for rotation by a motor (not shown).

The cylinder 11 is divided by the insulating partition 13 into two cavities 14 and 15. While the cavities 14 and 15 are identical in all respects and are preferably coated with a flat black coating, one of the two cavities is provided with some means, such as a resistance heating element 16 in the cavity 15 for raising its temperature, so that the cavity 15 becomes the hot cavity which is maintained at a higher temperature than the cold cavity 14. While the cavity temperatures must be different, it is not necessary to the satisfactory operation of the apparatus that the temperatures be known.

The sample of material 17 may be placed on a flat surface opposite or closely adjacent the position of the two arcuate slots 19 and 21 in one end of the cylinder 11, as the cylinder is rotated. However, if it is desired to measure the reflectance of a large area, such as the surface 18, the instrument may be portable and can be positioned adjacent this surface to measure the reflectance of the particular material or coating on the surface.

The mirrors 22 and 23 are focused on the detectors 24 and 25 respectively. The radiation received from the sample 17 through the slots 19 and 21 is focused by the mirror 22 on the detector 24, and the radiation from the inside of the cavities 14 and 15 is focused by the mirror 23 on the detector 25.

The radiation is received from the sample 17 and from the walls of the cavities 14 and 15 through the narrow arcuate slots 26 and 27 formed in the end wall of cylinder 11 opposite the wider arcuate slots 19 and 21.

OPERATION, MOD I

Consider a sample at temperature T irradiated with intensity G. The radiant energy leaving the sample surface will be the sum of the emitted and reflected energy. The output of the detector 24 viewing the sample will be proportional to this sum.

$$V_i = K_i[\rho G + \epsilon_s \sigma T_s^4] \quad 1.$$

where
$V_i$ = voltage output of detector 24
$K_i$ = proportionality constant
$\rho$ = sample reflectance
$G$ = surrounds irradiation on sample
$\epsilon_s$ = emittance of sample
$\sigma$ = Stephen Boltzman constant
$T_s$ = sample temperature If the sample is alternately irradiated with different intensity $G_1$ and $G_2$ and the sample temperature essentially does not change, the alternating output from the detector 24 will be:

$$V_i = V_{i1} - V_{i2} = K_i[\rho G_1 + \epsilon \sigma T_s^4] - K_i[\rho G_2 + \epsilon \sigma T_s^4]$$
$$V_i = K_i \rho [G_1 - G_2] \quad 2.$$

The sample reflectance can be determined from equation 2 if $G_1$ and $G_2$ are known. If the detector 25 views cavities 14 and 15 only, its output will be proportional to the irradiation $G_1$ or $G_2$. The alternating output of the detector 25, when the irradiation is alternately $G_1$ and $G_2$, will be $$V_j = K_j[G_1 - G_2] \quad 3.$$

where
$V_j$ = voltage output of detector 25
$K_j$ = proportionally constant

If detector 24 views the sample while detector 25 views the surrounds equations 2 and 3 may be combined to solve for the sample reflectance $\rho = (V_i/K_i[G_1-G_2]) = V_i K_j/V_j K_i \quad 4.$ Since $K_i$ and $K_j$ are constants they may be combined $$\rho = k(V_i/V_j) \quad 5.$$

The sample reflectance is therefore measured by taking the ratio of the two detector voltage outputs. The analysis was made on a total energy basis. However, the analysis on a monochromatic basis would be the same. By introducing a monochromator or appropriate filters, this method may be used for spectral measurements.

The two semicircular cavities 14 and 15 separated by insulation 13 are maintained at different temperatures $T_1$ and $T_2$. Detectors 24 and 25 view the sample 17 and cavity wall respectively through the small slits 26 and 27 at the top edge of the cavities. As the cavities 14 and 15 rotate the sample area viewed by detector 24 is alternately irradiated by a cavity at temperature $T_1$ and $T_2$ thus causing the sample 17 to be irradiated by a cavity at intensity $G_1$ and $G_2$. Detector 25 alternately views the cavities 14 and 25 giving a single proportional to the difference in sample irradiation $G_1$ and $G_2$. The sample reflectance may then be determined by equation 5. Suitable electronic circuitry indicated by the comparison circuit 20 in FIG. 1 including a summing amplifier or ratio detector may be used to provide an output voltage proportional to the reflectance of the sample.

MODIFICATION II

One preferred modification of the present invention illustrated in FIGS. 2 and 3, requires only one detector and optical system and overcomes the disadvantage of the device shown in FIG. 1, which requires careful matching of the two detectors 24 and 25 for optimum performance, and also requires a complex electronic circuit for combining the output of the two detectors 24 and 25 to provide a signal output corresponding to the reflectance in accordance with the ratio of equation 5.

In the modification of FIGS. 2 and 3, the reflectance measuring instrument is provided with a housing 31 which is preferably coated with flat black coating to eliminate the reflection of any stray radiation within the housing. A cylindrical rotor 32 is divided into cavities 33 and 34, which are preferably made from copper or some material having a high thermal conductance, and are mounted for rotation on a central shaft 35.

The cavity 33 is provided with a heating element 36 bonded or otherwise secured to its entire outer surface. However, if desired both cavities may be provided with a heating element, so that either cavity may be utilized as a hot cavity, but only one heater is used in any case.

The heating element 36 is provided with DC or AC power through a set of carbon brushes 37 and 38 connected to the heating element 36, and another set of carbon brushes 41 and 42 leading from a source of DC or AC power to the rotary contacts 43 and 44 mounted on the shaft 35.

The shaft 35 is driven through a sprocket 45 by means of a chain drive 46 from a motor 47. Chain 46 also engages a sprocket 48 to drive a mechanical rectifier or chopper 49, which essentially consists of a set of contact points to phase the cavity rotation and the operation of the amplifier. This will be described in more detail in conjunction with the block diagram of FIG. 4.

In this modification, the single detector 51 is utilized which may be a vacuum thermocouple with a potassium bromide window, or other types of radiation detector may be used depending on the particular application.

OPERATION, MOD II

The operation of the instrument illustrated in FIGS. 2 and 3 is somewhat similar to the operation of the device shown in FIG. 1, however, the electronic circuit illustrated in block diagram form in FIG. 4 is somewhat simpler than that required for a signal output from the device of FIG. 1.

The signal from the thermocouple detector 51 is amplified using a narrow band AC amplifier 62 which may operate at any suitable frequency such as 13 cycles/second.

The signal from the AC amplifier 62 goes through the mechanical rectifier or chopper points 49 to a DC voltmeter 63 which may be adjusted to provide an output proportional to the reflectance of the material.

The system is operated by supplying heater power one of the rotating cavities such as the cavity 33. This raises the temperature of the hot cavity 33 to a higher temperature such as 110° F., and the cold cavity 34 will be heated slightly by convection and conduction to a temperature of approximately 90° F. After equilibrium is reached between the two cavities 33 and 34, a zero reading is set by placing a cone, painted internally with flat black paint over the viewing port 59. Similarly a 100 percent reading is set using a highly reflective sample, such as a highly polished aluminum material, which is used to set the instrument at a particular scale reading, such as 97.5 percent depending on the particular material used. These settings are made using the zero and gain control adjustments of the AC amplifier 62.

The mathematical analysis given above with respect to the modification FIG. 1 also applies to the instrument of FIGS. 2 and 3. However, the setting of a zero and 100 percent scale reading, by placing the black cone and polished aluminum over the viewing port 58, in effect makes the term $V_f=1$ in the equation 5 above, since the energy reflected by the polished aluminum is substantially equal to the energy emitted by the cavity walls, and therefore the reading of the DC voltmeter 63 will indicate the variation of $V_{i}$, which will then be proportional to the reflectance of the sample.

Obviously many other modifications and variations the present invention may be made within the scope of the following claims.

I claim:

1. A method for measuring the reflectance of materials comprising:
    A. providing a hot source and a cold source of radiation;
    B. alternately exposing a sample of material to said hot and cold sources;
    C. detecting the radiation reflected by said material alternately from said hot and cold sources, and producing an AC signal corresponding thereto;
    D. comparing the AC signals and converting said AC signal to an output proportional to the reflectance of said material.

2. The method of measuring the reflectance of materials comprising:
    A. detecting the radiant energy reflected by the material from a relatively hot and cold source alternately, and providing an AC signal therefrom;
    B. detecting the radiant energy emitted by the hot and cold sources alternately, and providing an AC signal therefrom;
    C. comparing the AC signals from the detected energy reflected by the material and emitted by the sources and providing an output therefrom proportional to the reflectance of the material.

3. The method of measuring the reflectance of materials comprising:
    A. detecting the radiant energy reflected by the material alternately, from a relatively hot and cold cavity and providing an AC signal therefrom;
    B. detecting the radiant energy emitted alternately by said hot and cold cavities, and providing an AC signal therefrom;
    C. comparing the AC signals from the detected energy reflected by the material and emitted by said cavities and providing an output therefrom proportional to the reflectance of the material.

4. An instrument for measuring the reflectance of materials comprising:
    A. a rotor having a hot cavity and a cold cavity;
    B. each of said cavities having a slot at one end thereof and a second slot at the opposite end thereof;
    C. a radiation detector positioned to receive radiant energy reflected from a sample through both of said slots in alternate cavities sequentially;
    D. electrical means for converting the output of said detector into an output signal proportional to the reflectance of a material positioned adjacent one of said slots in said cavities during rotational movement thereof.

5. An instrument for measuring the reflectance of materials comprising:
    A. a rotor having a hot cavity and a cold cavity;
    B. each of said cavities having a slot at one end thereof and a second slot at the opposite end thereof;
    C. a radiation detector positioned to receive radiant energy reflected from a sample through both of said slots in alternate cavities sequentially;

D. electrical means for converting the output of said detector into an output signal proportional to the reflectance of a material positioned adjacent one of said slots in said cavities during rotational movement thereof;

E. said electrical means comprising an AC amplifier connected to said detector and a mechanical rectifier connected to said amplifier and driven at a speed corresponding to the speed of rotation of said cavities, and a DC voltmeter connected to said mechanical rectifier.

6. An instrument for measuring the reflectance of materials comprising:

A. a cylindrical rotor having a hot cavity and a cold cavity;

B. each of said cavities having an arcuate slot at one end thereof and a second arcuate slot at the opposite end thereof;

C. at least one radiation detector positioned to receive radiant energy reflected from a sample through one of said arcuate slots and then through the opposite arcuate slot of each of said cavities sequentially;

D. electrical means for converting the output of said detector into an output signal proportional to the reflectance of a material positioned adjacent said one arcuate slot in said cavities during rotational movement thereof.

7. An instrument for measuring the reflectance of materials comprising:

A. a cylindrical rotor having a hot cavity and a cold cavity;

B. each of said cavities having an arcuate slot at one end thereof and a second arcuate slot at the opposite end thereof;

C. at least one radiation detector positioned to receive radiation energy reflected from a sample through one of said arcuate slots and then through the opposite arcuate slot of each of said cavities sequentially;

D. electrical means for converting the output of said detector into an output signal proportional to the reflectance of a material positioned adjacent said one arcuate slot in said cavities during rotational movement thereof;

E. said electrical means comprising an AC amplifier connected to said detector and a mechanical rectifier connected to said amplifier and driven at a speed corresponding to the speed of rotation of said cavities, and a DC voltmeter connected to said mechanical rectifier.

8. An instrument for measuring the reflectance of materials comprising:

A. a rotor having a hot cavity and a cold cavity;

B. each of said cavities having a slot at one end thereof and a second slot at the opposite end thereof;

C. one radiation detector positioned to receive radiant energy reflected from a sample through one of said slots and then through the opposite slot of each of said cavities sequentially;

D. a second radiation detector positioned to receive radiant energy emitted from the walls of said cavities through said opposite slots of each of said cavities sequentially;

E. electrical means for converting the output of said detectors into an output signal proportional to the reflectance of a material positioned adjacent said one slot in said cavities during rotational movement thereof.

9. An instrument for measuring the reflectance of materials comprising:

A. a cylindrical rotor having a hot cavity and a cold cavity;

B. each of said cavities having an arcuate slot at one end thereof and a second arcuate slot at the opposite end thereof;

C. one radiation detector positioned to receive radiant energy reflected from a sample through one of said arcuate slots and then through the opposite arcuate slot of each of said cavities sequentially;

D. a second radiation detector positioned to receive radiant energy emitted from the walls of said cavities through said opposite arcuate slots of each of said cavities sequentially;

E. electrical means for converting the output of said detectors into an output signal proportional to the reflectance of a material positioned adjacent said one arcuate slot in said cavities during rotational movement thereof.

10. Means for sequentially irradiating a sample with relatively hot and cold radiation, said means including first and second cavities each having at least one radiation transparent aperture therein, said first cavity including means for heating it to an elevated temperature with respect to said second cavity, means for alternately exposing said sample to radiation passing through said cavity apertures, detector means fore receiving radiant energy from said sample and said cavities in a timed relation with said means for alternately exposing said sample, said timed relation being such that said detector means receives radiation from the sample while the sample is being exposed to radiation from one of said cavities, and for providing electrical signals in response thereto, and means coupled to said detector means for coupling said signals and for providing an output proportional to the reflectance of said sample.